United States Patent
Le Gonidec et al.

(10) Patent No.: US 9,037,380 B2
(45) Date of Patent: May 19, 2015

(54) DEVICE FOR ADJUSTING AN OPERATING VARIABLE OF AN ENGINE

(75) Inventors: Serge Le Gonidec, Vernon (FR); Olivier Faye, Menilles (FR)

(73) Assignee: SNECMA, Paris (FR)

( * ) Notice: Subject to any disclaimer, the term of this patent is extended or adjusted under 35 U.S.C. 154(b) by 545 days.

(21) Appl. No.: 12/615,548

(22) Filed: Nov. 10, 2009

(65) Prior Publication Data

US 2010/0121552 A1 May 13, 2010

(30) Foreign Application Priority Data

Nov. 13, 2008 (FR) ...................... 08 57684

(51) Int. Cl.
*F02K 9/56* (2006.01)
*F02K 9/58* (2006.01)

(52) U.S. Cl.
CPC ... *F02K 9/58* (2013.01); *F02K 9/56* (2013.01); *F05D 2270/3015* (2013.01)

(58) Field of Classification Search
CPC ............. F02K 9/00; F02K 9/56; F02K 9/563; F02K 9/58
USPC ......... 701/99, 36; 251/129.05; 60/200.1, 491, 60/538, 567, 589
See application file for complete search history.

(56) References Cited

U.S. PATENT DOCUMENTS

| | | | |
|---|---|---|---|
| 3,373,769 A | 3/1968 | Chaves, Jr. et al. | |
| 4,525,833 A * | 6/1985 | Cau et al. ..................... | 370/470 |
| 4,618,931 A | 10/1986 | Miller et al. | |
| 4,991,393 A | 2/1991 | Otten et al. | |
| 5,148,674 A * | 9/1992 | Morris .......................... | 60/240 |
| 5,589,805 A * | 12/1996 | Zuraski et al. ................ | 332/109 |
| 5,850,993 A | 12/1998 | Hubert | |
| 7,286,921 B2 * | 10/2007 | Kobayashi ..................... | 701/48 |
| 2003/0074498 A1* | 4/2003 | Gareis et al. .................. | 710/36 |
| 2008/0105789 A1* | 5/2008 | Smith et al. ................. | 244/171.1 |

FOREIGN PATENT DOCUMENTS

| | | |
|---|---|---|
| EP | 1967723 | 9/2008 |
| GB | 2172860 | 10/1986 |
| WO | WO2008/066485 A1 * | 6/2008 |

OTHER PUBLICATIONS http://web.archive.org/web/20081017203903/http://zone.ni.com/devzone/cda/ph/p/id/270.*
"DC Motors and Stepper Motors," http://www.electronics-tutorials.ws/io/io_7.html, Electronics Tutorial about Motors.

* cited by examiner

*Primary Examiner* — Fadey Jabr
*Assistant Examiner* — Aaron L Troost
(74) *Attorney, Agent, or Firm* — Preti Flaherty Beliveau & Pachios LLP

(57) ABSTRACT

A mechanism for regulating an engine by using an actuator that is controlled in bang-bang mode, in which non-linearities are introduced in the control strategy in order to avoid putting excessive demand on an electric motor. The actuator is controlled by power supply pulses, which is a specific type of bang-bang control and, therefore, the actuator can receive a certain number of discrete commands. In one example, the actuator can receive two types of commands, for rotating in one direction and for rotating in the other direction.

6 Claims, 5 Drawing Sheets

DEVICE FOR ADJUSTING AN OPERATING VARIABLE OF AN ENGINE

BACKGROUND OF THE INVENTION

The invention lies in the field of regulating an engine.

It applies in privileged but non-limiting manner to controlling a rocket engine.

In general, regulated engines respond to external setpoints, with the regulation law serving to adjust orders that are applied to valves so as to tend to bring the engine to the operating point that complies with the setpoints, and so as to keep it there.

For example, in a rocket engine, a setpoint for increasing thrust, when applied to the regulator, has the effect of correcting the positions of valves so as to increase the variable that is representative of pressure in the combustion chamber of the engine.

In the present state of the art, servo-controlling actuators, e.g. valves, requires expensive electronics, since such actuators require fast actuation speeds in order to provide effective control with very short transients.

As a result, valve actuators usually have a large passband and a high electrical power rating, thereby requiring their position to be controlled continuously relative to the setpoint and thus requiring control electronics that are dedicated to a local servo-control loop, which is expensive in terms of the electronics and the energy used for control purposes.

The present invention seeks to respond to this problem by using slow actuators that are controlled in bang-bang mode and that do not require complex electronics. It is recalled that control in bang-bang mode is on/off control.

OBJECT AND SUMMARY OF THE INVENTION

In general, the present invention proposes a mechanism for regulating an engine by using slow actuators that are controlled in bang-bang mode, in which non-linearities are advantageously introduced in the control strategy in order to avoid putting excessive demand on the electric motor.

More precisely, in a first aspect, the invention provides a device for adjusting at least one operating variable of an engine as a function of a setpoint, the device comprising:

error calculation means for calculating an error that is obtained from the difference between the measurement of the variable and the setpoint;

a command generator unit responding to the error to generate a bang-bang type command for application to a slow actuator;

an inhibit unit placed upstream from the command generator unit and suitable for inhibiting the error when it lies within a determined range;

a duration quantizing unit for quantizing the duration of the command; and a sender unit for sending the command to the actuator.

The invention also provides an engine including: at least one slow actuator; and an adjustment device as mentioned above, suitable for generating a command for application to said actuator(s).

The invention also provides an adjustment method for adjusting at least one operating variable of an engine as a function of a setpoint, the method comprising:

a calculation step of calculating an error obtained from the difference between a measurement of the variable and the setpoint;

an inhibit step of inhibiting the error when it lies within a determined range;

a command generation step responsive to the error to generate a bang-bang type command for application to a slow actuator;

a quantizing step of quantizing the duration of the command; and a sending step of sending the command to said actuator.

Most advantageously, the inhibit module of the device of the invention (and correspondingly the inhibit step of the method of the invention) avoids causing the slow actuator to oscillate pointlessly in the vicinity of the desired operating point.

In a preferred embodiment of the invention, the above-mentioned range, also known as a "dead zone", is itself definable, thus constituting an adjustment parameter of the engine.

Advantageously, the duration quantizing unit enables pulse durations to be subdivided at the maximum clock rate of the bus or at a multiple of said clock rate.

In a particular implementation of the invention, the adjustment device further includes quantizing the amplitude of said command.

By means of this third non-linearity, the engine is not given a command unless that command would be above some minimum threshold, thereby avoiding repeated commands for variations in command amplitude that are too small.

In an embodiment of the invention, the amplitude quantizing pitch is an adjustment parameter of the engine.

In a variant embodiment of the invention, each actuator includes electronics suitable for processing the command received from the adjustment device.

In a preferred variant, the device of the invention sends the command to the actuator in the form of a frame, said frame being subdivided cyclically into a plurality of fields, each field being associated with a possible operation of the actuator and containing a binary value for performing or not performing said operation.

In a variant embodiment of the invention, the actuator is connected to the adjustment device by a bus via an interface, the interface comprising:

a port addressable by the adjustment device;

means for receiving, via the port, the digital frame containing the command, the frame being subdivided cyclically into a plurality of fields, each field containing a binary value; and means for processing each field independently and for applying a command to the slow actuator as a function of the binary value contained in the field.

This preferred variant embodiment advantageously avoids the need to develop on-board electronics for servo-controlling the actuators.

In a particular implementation, the various steps of the adjustment method are determined by computer program instructions.

Consequently, the invention also provides a computer program on a data medium, the program being suitable for being implemented in an adjustment device, or more generally in a computer, the program including instructions adapted to implementing the steps of an adjustment method as described above.

The program may use any programming language, and it may be in the form of source code, of object code, or of code intermediate between source code and object code, such as in a partially compiled form, or in any other desirable form.

The invention also provides a data medium readable by a computer, and including instructions of a computer program as mentioned above.

The data medium may be any entity or device capable of storing the program. For example, the medium may comprise storage means such as a read-only memory (ROM), e.g. a compact disk (CD) ROM or a microelectronic circuit ROM, or indeed magnetic recording means, e.g. a floppy disk or a hard disk.

The data medium may also be a transmission medium such as an electrical or optical signal suitable for being conveyed by an electrical or optical cable, by radio, or by other means. The program of the invention may in particular be downloaded from a network of the Internet type.

Alternatively, the data medium may be an integrated circuit in which the program is incorporated, the circuit being adapted to execute, or to be used in the execution of, the method in question.

BRIEF DESCRIPTION OF THE DRAWINGS

Other characteristics and advantages of the present invention appear from the following description with reference to the accompanying drawings that show an embodiment having no limiting character. In the figures.

DETAILED DESCRIPTION OF AN EMBODIMENT

Figure 1:
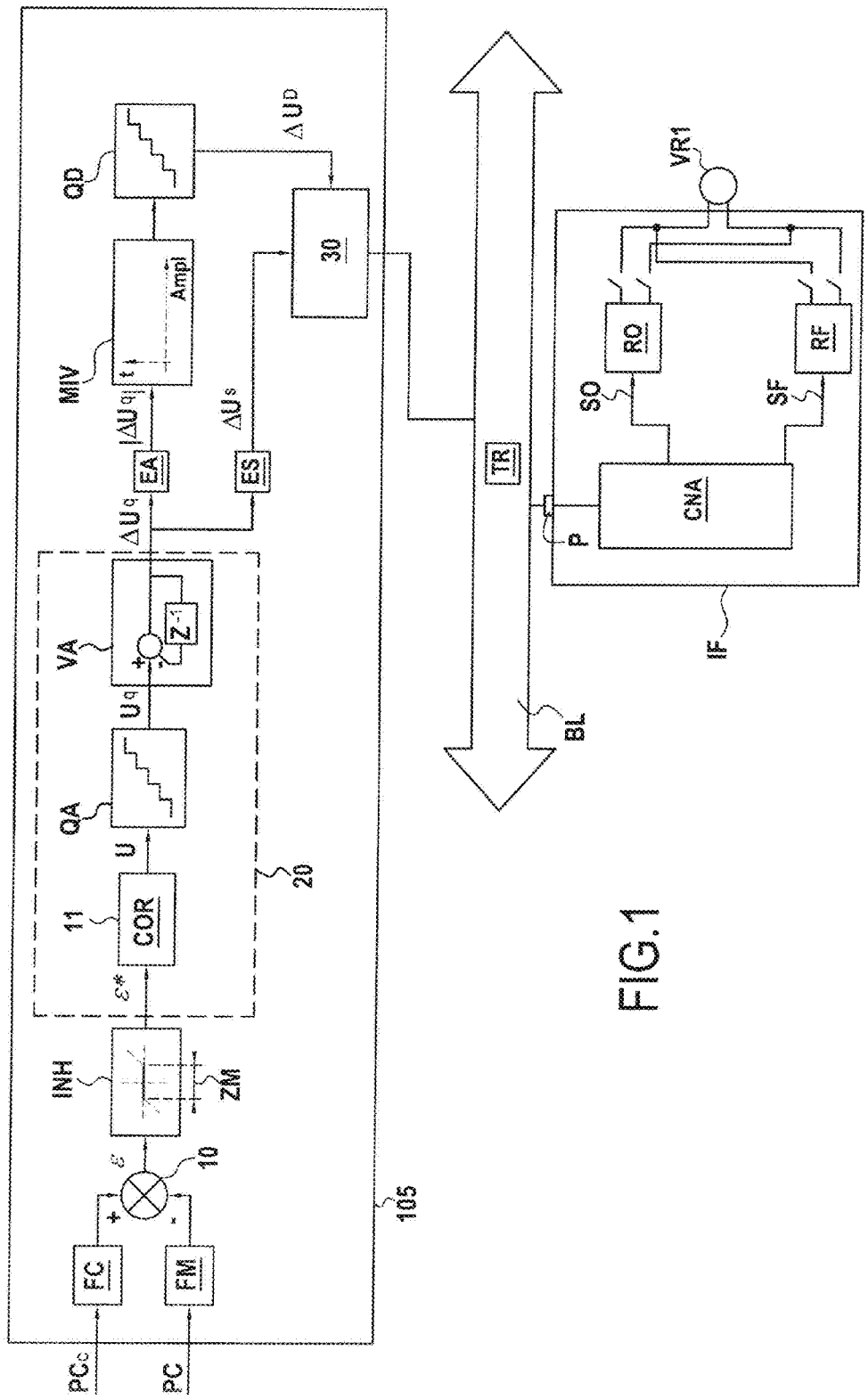
FIG. 1 is a diagram of an adjustment device in accordance with the invention in a first particular embodiment.

FIG. 1 shows a device 105 for adjusting an operating variable PC as a function of a setpoint $PC_C$. The device 105 is connected via a bus BL to a slow actuator VR1.

In accordance with the invention, the slow actuator VR1 is controlled in bang-bang mode.

In the embodiment described, the slow actuator is controlled by power supply pulses, which is a specific type of bang-bang control. The slow actuator can thus receive a certain number of discrete commands.

In the embodiment described herein, it is assumed that the actuator can receive two types of command, respectively for rotating in one direction or for rotating in the other.

The command of the actuator comprises the direction of rotation and the duration of said rotation. The power supply pulses are thus of variable duration and of one sign or the other as a function of the direction of rotation.

In the embodiment described herein, the actuator VR1 is connected to the bus BL by an interface IF, the interface IF including in particular a port P that is addressable by the adjustment device 105.

Both a measurement of the variable PC, and the setpoint $PC_C$ are supplied as inputs to the adjustment device 105.

In the embodiment described herein, the measurement PC and the setpoint $PC_C$ are filtered respectively by a measurement filter FM and by a setpoint filter FC.

The outputs from these filters are applied as inputs to a subtractor 10 suitable for calculating an error $\epsilon$ by taking the difference between the measurement PC of the variable and its setpoint $PC_C$.

In accordance with the invention, the adjustment device 105 includes an inhibit module INH suitable for inhibiting (or zeroing) the error $\epsilon$ at the output from the subtractor 10 when said error lies in a predetermined range referred to as the dead zone ZM.

In the embodiment described herein, the dead zone ZM is a parameter of the device 105 that can be adjusted.

The output $\epsilon^*$ from the inhibit unit INH is delivered as an input to a corrector 11 suitable for generating a command U.

The corrector 11 does not form part of the invention proper. For example, it is possible to use a simple integrator.

In the embodiment described herein, the command U at the output from the corrector 11 is quantized in amplitude by a quantizing unit QA. The quantized command $U^q$ is supplied as an input to a differentiator VA suitable for calculating the amplitude variation $\Delta U^q$ on each calculation cycle.

In the meaning of the patent, the association of the corrector 11 with the quantizer QA and the differentiator VA is said to constitute a command generator unit 20 located downstream from the inhibitor INH.

In the embodiment described herein, the amplitude variation $\Delta U^q$ is supplied as an input:

to an amplitude extractor EA suitable for calculating the modulus $|\Delta U^q|$ of the amplitude variation; and a module ES suitable for calculating the sign $\Delta U^S$ of said amplitude variation.

The modulus $|\Delta U^q|$ of the amplitude variation is supplied as an input to a module MIV suitable for determining the duration $\Delta U^D$ of the command applied to the actuator VR1 as a function of the amplitude $|\Delta U^q|$.

This duration is quantized by a duration quantizer QD.

In the embodiment described herein, the control of the actuator is thus made up of:

firstly the duration $\Delta U^D$ of each command applied to the relays; and secondly by a sign $\Delta U^S$ representative of the desired direction of rotation.

In the embodiment described herein, the adjustment device 105 of the invention includes sender means 30 for sending to the slow actuator VR1 the sign $\Delta U^S$ representative of the direction of rotation of the actuator and the duration $\Delta U^D$ representing the relay command duration.

Figure 2:
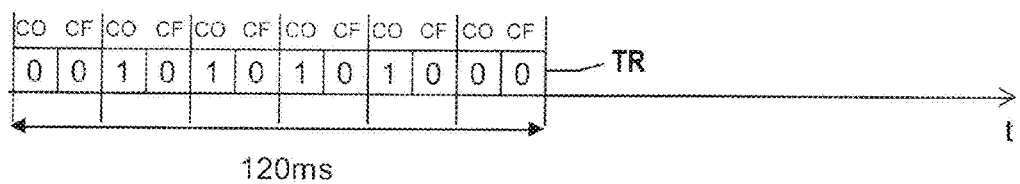
FIG. 2 shows a frame that is suitable for use in the invention.

FIG. 2 shows a frame TR used in an embodiment of the invention.

In the embodiment described herein, the frame TR has a duration of 120 milliseconds (ms). It is made up of twelve fields CO, CF distributed cyclically in the frame TR, each of these fields having a resolution duration or minimum period of 10 ms, this duration corresponding to the maximum clock rate of the bus, or to a multiple of said clock rate.

Each of the fields CO and CF of the frame TR is associated with one actuator command, i.e. in the example described, for causing the actuator to turn in one direction or in the other for 10 ms.

In the embodiment described herein, the interface IF placed between the actuator VR1 and the bus BL comprises, behind the port P, an analog-to-digital converter ADC suitable for generating a signal SO or SF applied to a relay RO or RF in order to cause the actuator VR1 to turn in one direction or the other.

More precisely, in the example described, when the field CO (or respectively CF) has binary value 1, then the analog-to-digital converter ADC generates a signal SO (or respectively SF) for application to the relay RO (or respectively RF) to cause the actuator to turn in the corresponding direction.

Thus, the frame TR of FIG. 2 needs to be interpreted as follows:

no signal to relay RF;

signal SO of 80 ms duration sent to relay RO between instants 20 ms and 100 ms.

With reference to FIGS. 3 to 7, there follows a description of an example of adjusting the variable PC as a function of the setpoint $PC_C$.

Figure 3:
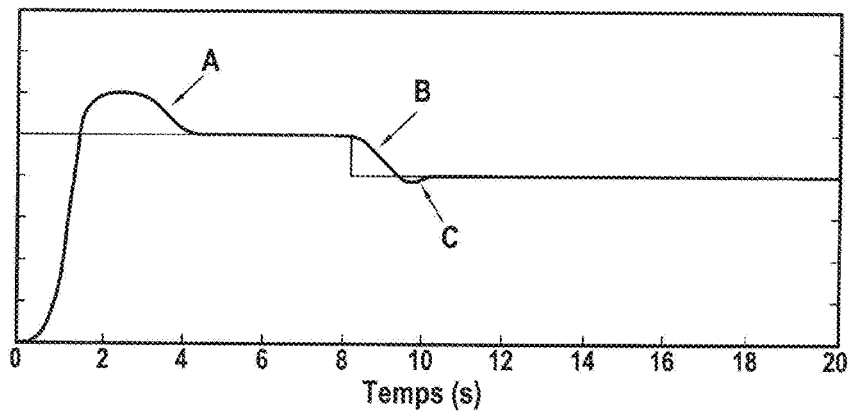
FIGS. 3 to 7 are timing charts showing the operation of the FIG. 1 adjustment device.

FIG. 3 shows variation in the setpoint $PC_C$ as a fine line and variation in the measurement of the variable PC as a bold line.

In this example, the setpoint has a first value during 8 seconds (s), and then a second value, lower than the first value, from the $8^{th}$ second to the $20^{th}$ second.

It should be observed that the variable PC increases from instant 0 until it exceeds the setpoint value $PC_C$, and then (zone A) decreases during instants 2 s and 4 s so as to rejoin the setpoint, decreases again (zone B) from instant 8 s until it reaches a value below the setpoint $PC_C$, and rises a little (zone C) to join the setpoint $PC_C$.

Figure 4:
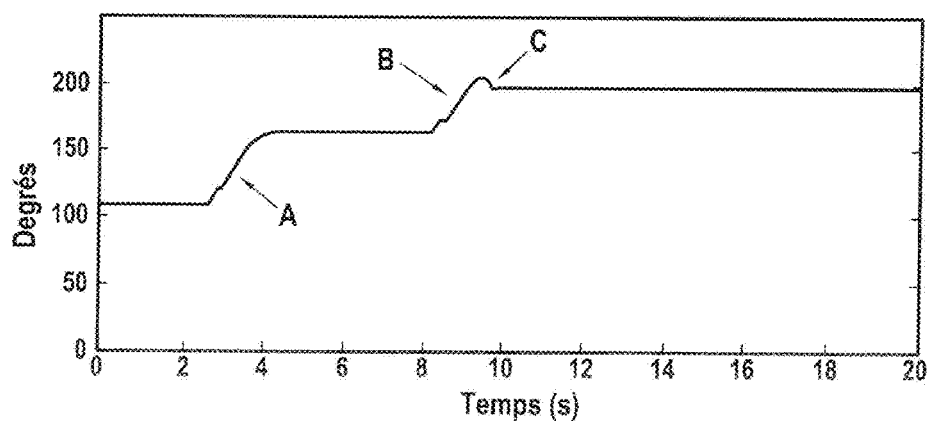

This variation in the measurement of the variable PC is explained by the way actuator VR1 is controlled, as shown in FIG. 4.

In this figure, the degree of opening of the actuator VR1 is plotted as a function of time.

In conformity with FIG. 3, it can be seen that the angle is constant for about 2 s, and then increases (zone A) to decrease the value of the variable PC so as to join the setpoint for the first time, increases again (zone B) so as to decrease the variable PC after the $8^{th}$ second, then decreases a little (zone C) to cause the value of the variable PC to rise in order to join the setpoint $PC_C$.

Figure 5:
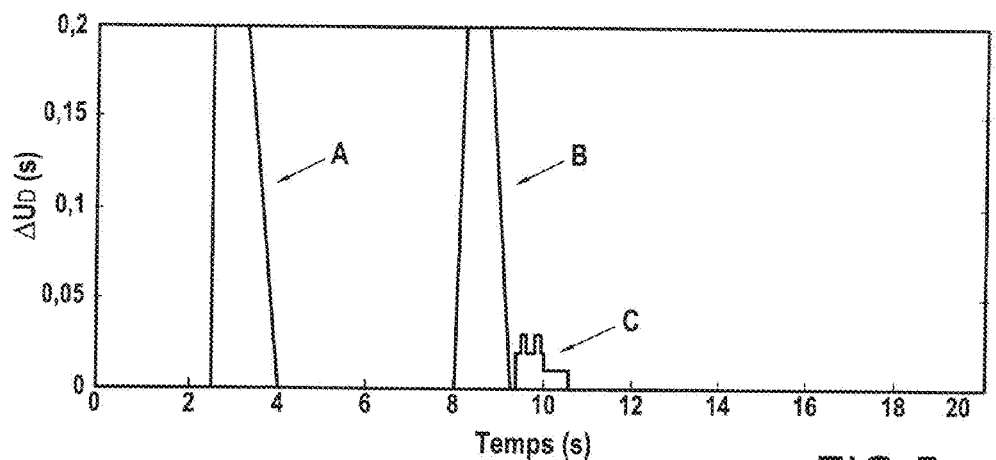
Figure 6:
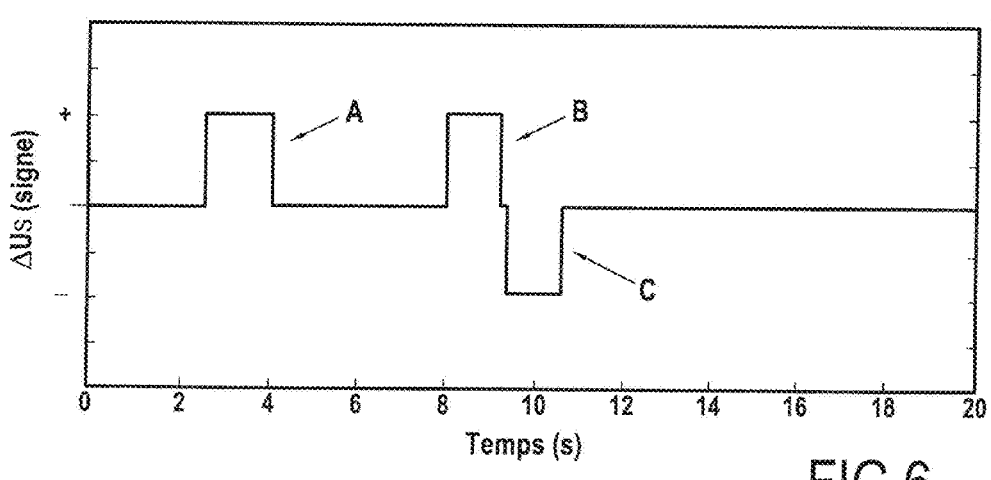

FIGS. 5 and 6 show respectively the duration DUD and the sign $\Delta U^S$ (direction of rotation) for controlling the actuator VR1.

Thus, the zones A and B in each of these figures represent respectively controlling the actuator VR1 to turn in a first direction, and the zone C represents controlling the actuator VR1 to turn in the opposite direction for a short duration in order to compensate the probable overshoot of operation B.

Figure 7:
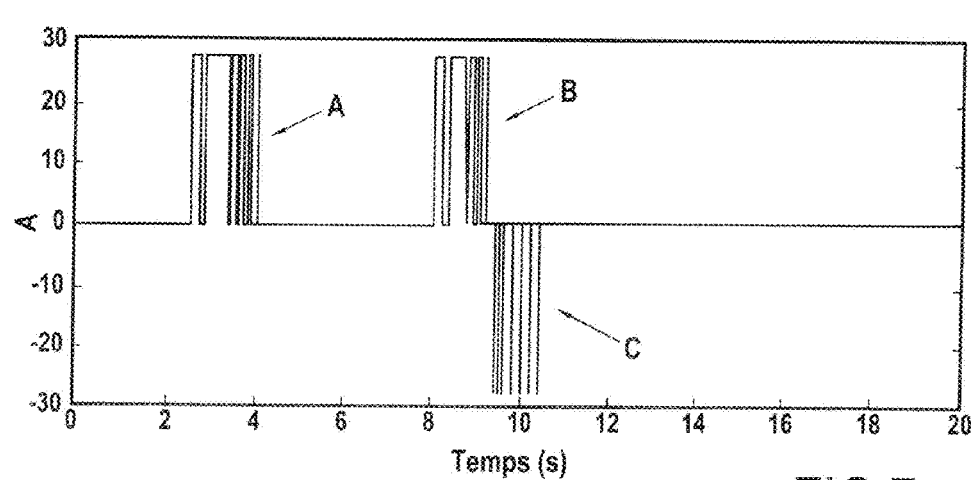

FIG. 7 plots the electric current passing through the motor of the actuator VR1. In the embodiment described herein, the motor is powered with direct current (DC).

This figure shows clearly the great advantage of the invention, whereby the inhibit module INH and the two quantizers QA and QD enable the motor to be powered only by the amount that is strictly necessary for controlling the valve VR1, without any pointless electricity consumption in the vicinity of the desired operating point.

Figure 8:
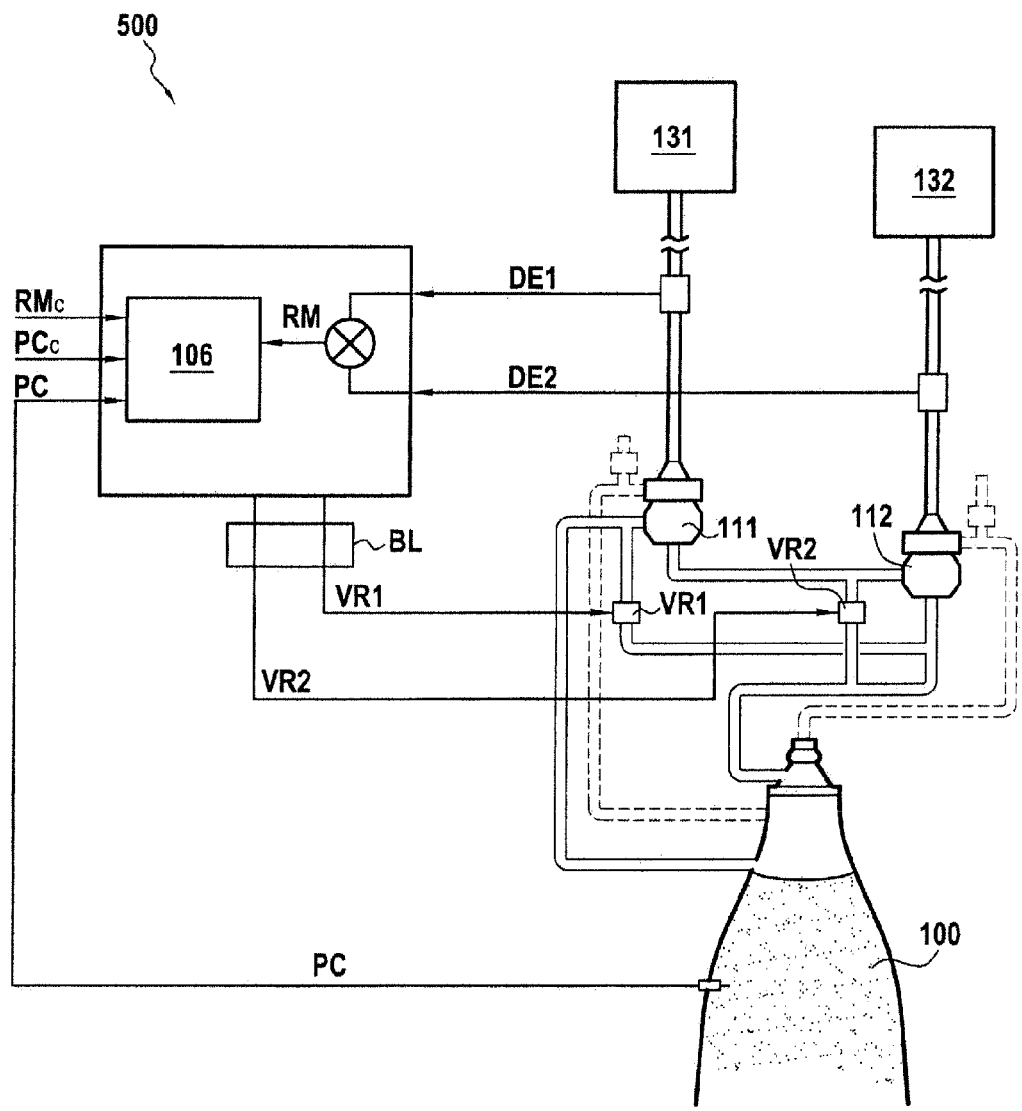
FIG. 8 shows a rocket engine in accordance with the invention.

With reference to FIG. 8, there follows a description of a rocket engine 500 in accordance with the invention.

The invention is applied here in a multivariable context, as described below.

In this example, the engine 500 in accordance with the invention includes two propellant tanks referenced 131 and 132, each of them upstream from a respective pump 111, 112. The delivery rate of each of these propellants can be controlled by slow valves VR1 and VR2. In the example of FIG. 1, the adjustment device 105 of the invention is described in a single variable context (adjusting the value of PC as a function of the setpoint $PC_C$).

In the embodiment described here, the engine 500 includes a device 106 in accordance with the invention for adjusting two variables, namely a pressure PC in the combustion chamber 100 and a mass ratio RM between the two propellants as delivered to the combustion chamber 100.

Figure 9:
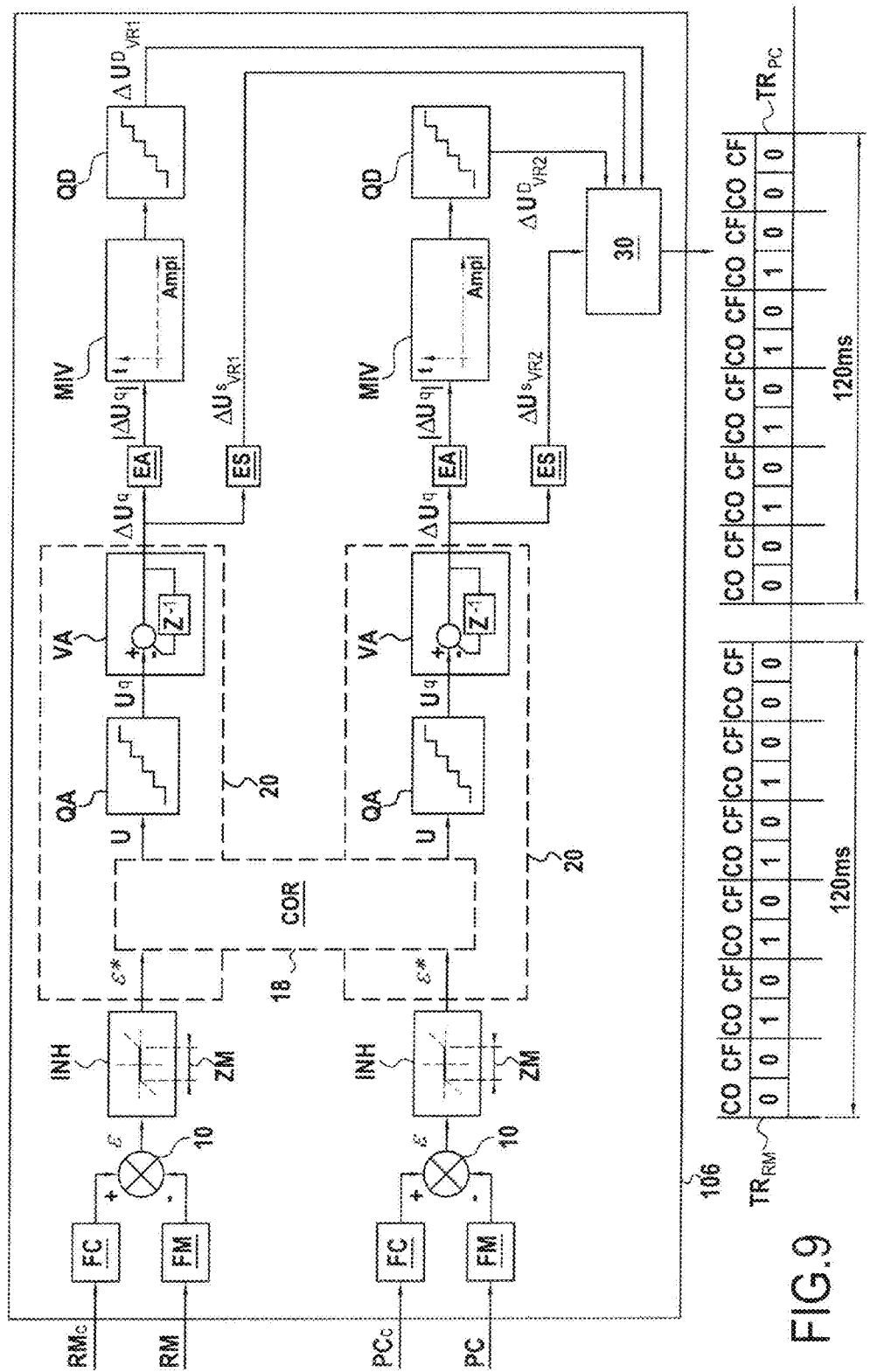
FIG. 9 shows the adjustment device in accordance with the invention incorporated in the FIG. 8 engine.

The device 106 is shown in FIG. 9. It can be derived directly from the device 105 of FIG. 1 and it is not described in detail. The person skilled in the art can understand that the device generates frames $TR_{RM}$ and $TR_{PC}$ that are delivered respectively to the vales VR1 and VR2, each of these frames comprising commands for causing the valve in question to turn for a duration $\Delta U_{VR1}{}^D$, $\Delta U_{VR2}{}^D$ in a direction $\Delta U_{VR1}{}^S$, $\Delta U_{VR2}{}^S$.

Consequently, in this example, the device 106 receives two input setpoints, i.e. a pressure setpoint $PC_C$ for the combustion chamber 100 and a mass flow ratio setpoint $RM_C$ concerning the two propellants delivered to the combustion chamber 100.

The device 106 thus adjusts the values of the controlled parameters, i.e. the pressure PC in the combustion chamber 100 and the ratio RM between the flow rates DE1 and DE2 upstream from the pumps 111 and 112 without pointlessly stressing the engine 500 with the help of a multivariable corrector 18 or two independent monovariable correctors 11.

In the above-described example, the motor is DC powered.

Naturally, the invention also applies to motors that are powered with alternating current (AC). The interface IF placed between the actuator VR1 and the bus BL then needs to be modified as a function of the power supply for the motor, in a manner that is known to the person skilled in the art.

What is claimed is:

1. An adjustment device for adjusting at least one operating variable of an engine as a function of a setpoint, the device comprising:
    means for calculating a difference between a measurement of said at least one operating variable and said setpoint and if the calculated difference lies within a predetermined range then outputting an error value of zero otherwise outputting the error value equal to the calculated difference;
    a first quantizer configured to quantize an amplitude of said error value;
    means for determining a command duration as a function of a variation of said quantized error value amplitude;
    a second quantizer configured to quantize said determined command duration; and
    a sender unit configured to send a command of the bang-bang type in the form of a frame addressed to a port of an actuator configured to respond to a certain number of discrete commands, said command being a function of said quantized command duration and a sign of the variation of said quantized error value amplitude,
    wherein said frame has a predetermined duration, and is subdivided cyclically into a predetermined number of pairs of first and second fields,
    wherein each field is of a same field time duration,
    wherein the first field corresponds to a first operation of the actuator in a first rotation direction and the second field corresponds to a second operation of the actuator in a second rotation direction,
    wherein each field includes one of a first or second value for asserting or not asserting, respectively, said corresponding actuator operation for the corresponding field time duration, and
    wherein a number of fields including the first value in each frame is a function of the quantized command duration.

2. The adjustment device according to claim 1, further comprising means for defining said predetermined range.

3. An engine including:
    at least one actuator configured to respond to a certain number of discrete commands; and
    an adjustment device, coupled to the at least one actuator, configured to adjust at least one operating variable of an engine as a function of a setpoint, the adjustment device comprising:
        means for calculating a difference between a measurement of said at least one operating variable and said setpoint and if the calculated difference lies within a predetermined range then outputting an error value set to zero otherwise outputting an error value equal to the calculated difference;
a first quantizer configured to quantize an amplitude of said error value;
means for determining a command duration as a function of a variation of said quantized error value amplitude;
a second quantizer configured to quantize said determined command duration; and
a sender unit configured to send a command of the bang-bang type in the form of a frame addressed to a port of said at least one actuator, said command being a function of said quantized command duration and a sign of the variation of said quantized error value amplitude,
wherein said frame has a predetermined duration, and is subdivided cyclically into a predetermined number of pairs of first and second fields,
wherein each field is of a same field time duration,
wherein the first field corresponds to a first operation of the at least one actuator in a first rotation direction and the second field corresponds to a second operation of the at least one actuator in a second rotation direction,
wherein each field includes one of a first or second value for asserting or not asserting, respectively, said corresponding actuator operation for the corresponding field time duration, and
wherein a number of fields including the first value in each frame is a function of the quantized command duration.

4. The engine according to claim 3, wherein:
said at least one actuator is connected to said adjustment device by a bus via an interface, said interface comprising:
a port addressable by said adjustment device;
means for receiving, via said port, said frame; and
means for processing each of said fields independently and for sending or not sending a control signal to said at least one actuator as a function of the value contained in the field.

5. In a device for adjusting at least one operating variable of an engine as a function of a setpoint, a method of adjusting said at least one variable comprising:
receiving a measurement of said at least one engine variable at said device;
calculating a difference between said at least one operating variable measurement and said setpoint and if the calculated difference lies within a predetermined range then setting an error value to zero otherwise setting the error value equal to the calculated difference;
quantizing an amplitude of said error value;
determining a command duration as a function of a variation of said quantized error value amplitude;
quantizing said determined command duration; and
sending a command of the bang-bang type in the form of a frame addressed to a port of an actuator configured to respond to a certain number of discrete commands, said command being a function of said quantized command duration and a sign of the variation of said quantized error value amplitude,
wherein said frame has a predetermined duration, and is subdivided cyclically into a predetermined number of pairs of first and second fields,
wherein each field is of a same field time duration,
wherein the first field corresponds to a first operation of the actuator in a first rotation direction and the second field corresponds to a second operation of the actuator in a second rotation direction,
wherein each field includes one of a first or second value for asserting or not asserting, respectively, said corresponding actuator operation for the corresponding field time duration, and
wherein a number of fields including the first value in each frame is a function of the quantized command duration.

6. A non-transitory computer-readable medium on which there is recorded a computer program including instructions for implementing, on a computer, a method of adjusting at least one operating variable of an engine as a function of a setpoint, the method comprising:
receiving a measurement of said at least one operating variable;
calculating a difference between said received measurement and said setpoint and if the calculated difference lies within a predetermined range then setting an error value to zero otherwise setting the error value equal to the calculated difference;
quantizing an amplitude of said error value;
determining a command duration as a function of a variation of said quantized error value amplitude;
quantizing said determined command duration; and
sending a command of the bang-bang type in the form of a frame addressed to a port of an actuator configured to respond to a certain number of discrete commands, said command being a function of said quantized command duration and a sign of the variation of said quantized error value amplitude,
wherein said frame has a predetermined duration, and is subdivided cyclically into a predetermined number of pairs of first and second fields,
wherein each field is of a same field time duration,
wherein the first field corresponds to a first operation of the actuator in a first rotation direction and the second field corresponds to a second operation of the actuator in a second rotation direction,
wherein each field includes one of a first or second value for asserting or not asserting, respectively, said corresponding actuator operation for the corresponding field time duration, and
wherein a number of fields including the first value in each frame is a function of the quantized command duration.

* * * * *